United States Patent [19]

Zünkler

[11] Patent Number: 5,555,344

[45] Date of Patent: Sep. 10, 1996

[54] METHOD FOR RECOGNIZING PATTERNS IN TIME-VARIANT MEASUREMENT SIGNALS

[75] Inventor: Klaus Zünkler, Dachau, Germany

[73] Assignee: Siemens Aktiengesellschaft, Munich, Germany

[21] Appl. No.: 211,201

[22] PCT Filed: Sep. 4, 1992

[86] PCT No.: PCT/DE92/00744

§ 371 Date: Mar. 18, 1994

§ 102(e) Date: Mar. 18, 1994

[87] PCT Pub. No.: WO93/06591

PCT Pub. Date: Apr. 1, 1993

[30] Foreign Application Priority Data

Sep. 20, 1991 [DE] Germany ............... 41 31 387.9

[51] Int. Cl.⁶ ................ G10L 5/06; G10L 9/00
[52] U.S. Cl. ............ 395/2.51; 395/2.4; 395/2.64; 395/2.65
[58] Field of Search ............ 381/41–43; 395/2, 395/2.4, 2.45, 2.51, 2.5, 2.52, 2.65, 2.49, 2.63–2.64

[56] References Cited

U.S. PATENT DOCUMENTS

| | | | |
|---|---|---|---|
| 4,677,672 | 6/1987 | Ukita et al. | 381/43 |
| 4,741,036 | 4/1988 | Bahl et al. | 395/2.65 |
| 4,803,729 | 2/1989 | Baker | 381/43 |
| 4,975,959 | 12/1990 | Benbassat | 381/41 |
| 5,170,432 | 12/1992 | Hackbarth et al. | 381/43 |
| 5,228,087 | 7/1993 | Bickerton | 381/43 |
| 5,333,275 | 7/1994 | Wheatley et al. | 395/2.52 |
| 5,390,278 | 2/1995 | Gupta et al. | 395/2.52 |
| 5,425,129 | 6/1995 | Garman et al. | 395/2.65 |

OTHER PUBLICATIONS

"An Introduction to Hidden Markov Models", L. R. Rabiner, B. H. Juang, IEEE Transactions on Acoustics, Speech and Signal Processing, Jan. 1986, pp. 4–16.

"Mathematical Methods of Feature Selection in Pattern Recognition", J. Kittler, International Journal, Man–Machine Studies, (1975), pp. 609–637.

Nakaga wa et al, "A method for continuous speech segmentation using HMM"; 9th Internation Conference on Pattern Recognition, pp. 960–962, 1988.

Ma et al, "TDNN Labeling for a HMM Recognizer"; ICASSP '90, pp. 421–423, 1990.

Brummer et al, "Automatic speaker independent alignment of continuous speech with its phonetic transcription using a hidden markov model"; COMSIG 88, pp. 35–40, 1988.

Primary Examiner—Robert W. Downs
Assistant Examiner—Tariq Hafiz
Attorney, Agent, or Firm—Hill, Steadman & Simpson, a Professional Corporation

[57] ABSTRACT

In automatic speech recognition, confusion easily arises between phonetically similar words (for example, the German words "zwei" and "drei") in the case of previous recognition systems. Confusion of words which differ only in a single phoneme (for example, German phonemes "dem" and "den") occurs particularly easily with these recognition systems. In order to solve this problem, a method for recognizing patterns in time-variant measurement signals is specified which permits an improved discrimination between such signals by reclassifying in pairs. This method combines the Viterbi decoding algorithm with the method of hidden Markov models, the discrimination-relevant features being examined separately in a second step after the main classification. In this case, different components of feature vectors are weighted differently, it being the case that by contrast with known approaches these weightings are performed in a theoretically based way. The method is suitable, inter alia, for improving speech-recognizing systems.

14 Claims, 2 Drawing Sheets

METHOD FOR RECOGNIZING PATTERNS IN TIME-VARIANT MEASUREMENT SIGNALS

BACKGROUND OF THE INVENTION

The problem arises in various fields of pattern recognition of having to make use of multidimensional feature vectors whose individual components, the features, are relevant in different ways in the case of different patterns to be recognized. This situation occurs, in particular, in automatic speech recognition, in which when previous recognition systems are used it is easy for phonetically similar words, (for example, German words "zwei" and "drei") to be confused. It is particularly easy when using known recognition systems to confuse words which differ only in a single phoneme (for example, German phonemes "dem" and "den"). This problem becomes still more acute in the case of speaker-independent recognition of speech which is carried over telephone lines, because due to the reduced transmission bandwidth of 3.4 kHz speech-relevant frequency ranges are lost (for example, The sounds /s/ and /f/ can no longer be distinguished over the telephone).

Some of these known recognition systems are based on a direct pattern comparison of stored reference words and the actually spoken word, with account being taken of temporal fluctuations in rate of speech. These fluctuations are taken into account with the aid of dynamic programming, for example. Moore has proposed an approach for such recognition systems (R. K. Moore, M. J. Russel, M. J. Tomlinson, "The discriminative network: A mechanism for focusing recognition in whole word pattern matching", IEEE International Conference on Acoustics, Speech and Signal Processing, pp. 1041–1044, Boston, 1983, ICASSP), which automatically finds the discrimination-relevant parts of words and weights these more strongly by comparison with the other parts. A disadvantage of this method is that the automatic search of discrimination-relevant parts can be affected by errors in the case of confusable word pairs. Discrimination-relevant word parts are not always found, or word parts are wrongly regarded as discrimination-relevant. This problem also cannot be solved in principle using the method of dynamic programming alone.

SUMMARY OF THE INVENTION

In other fields of signal processing and pattern recognition, very similar problems occur as in the field of speech recognition. It is therefore the object of the invention to specify a method for recognizing patterns in time-variant measurement signals, by means of which the frequency of the confusion of similar feature vectors can be substantially reduced. This object is achieved with the aid of a method for recognizing patterns in time-variant measurement signals by classifying a temporal sequence of pattern vectors and by reclassification in pairs.

In this method, the sequence of feature vectors which is to be classified is segmented with the aid of a Viterbi decoding algorithm by comparing this sequence to be classified with a set of hidden Markov models. For this purpose, there is calculated for each hidden Markov model a total emission probability for the generation of the sequence to be classified by this hidden Markov model. Subsequently, an optimum assignment path from feature vectors to states of the hidden Markov models is determined by backtracking.

A discriminating comparison of the assignments is carried out for selected or all pairs of hidden Markov models by calculating modified total emission probabilities for each hidden Markov model of a pair on the assumption that the respective other hidden Markov model of the same pair competes with the hidden Markov model under review, and by determining the respective more probable hidden Markov model of a pair. Thereafter, the hidden Markov model with the largest total emission probability is selected from among all the pairs under review.

The method has the advantage that a pattern to be classified is compared not with a reference pattern but with a statistical distribution function of many reference patterns. In this way, it is not a simple distance between two patterns to be recognized which is obtained, as is the case with dynamic programming, but a probability for the generation of a pattern by a hidden Markov model. The method of the hidden Markov models is comprehensively described in the article by L. R. Rabiner and W. H. Juang, "An introduction to hidden Markov models", IEEE Transactions on Acoustics, Speech and Signal Processing, (1): 4–16, Jan. 1986. By contrast with the method of Moore, no use is made of heuristically calculated weightings in the method present here; rather, use is made of weightings based on information theory. These weightings represent recognition rate,.; which are estimated with the aid of the distribution density functions on which the hidden Markov models are based. In this case, a weighting of 1.0 signifies a one hundred percent estimated recognition rate, that is to say the recognition is absolutely certain at this instant of analysis, while a weighting of 0 signifies that no statement can be made on the pattern to be classified.

In the method present here, it is not the emission probabilities of feature vectors which are weighted, but emission probabilities of individual components of feature vectors. As a result, a different weighting of the relevance of individual feature vector components is possible, so that the influence of individual components on the recognition performance can be selectively influenced precisely in the case of the use of multi-dimensional feature spaces.

Advantageous developments of the invention are as follows.

The total emission probability for generating the sequence to be classified by a hidden Markov model is calculated by calculating for all feature vectors of the sequence to be classified and for all states of the hidden Markov model a local logarithmic emission probability for generating the respective feature vector by the respective state. An accumulated logarithmic emission probability is calculated for each state as a sum of its local logarithmic emission probability and the accumulated logarithmic emission probability of its best possible predecessor state, the best possible predecessor state being logged.

The discriminating comparison of the assignments of two hidden Markov models is carried out by calculating for all feature vectors of the temporal sequence a local logarithmic modified emission probability for generating the respective feature vector by the corresponding state of the respective hidden Markov model by adding these local logarithmic modified emission probabilities recursively along the already calculated assignment path to an accumulated logarithmic modified emission probability. The modified local emission probability for generating a feature vector by a state of a hidden Markov model is calculated by calculating a logarithmic emission probability for each component of this feature vector and multiplying it by a weighting. These weighted logarithmic emission probabilities are summed over all components of this feature vector. The weighting of a component of a feature vector is in this case a measure of the reliability of this component on the assumption that only two specific states of a hidden Markov model are to be compared with one another. The weightings are determined with the aid of a statistic quality measure for the reliability of a feature vector component or a training method.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
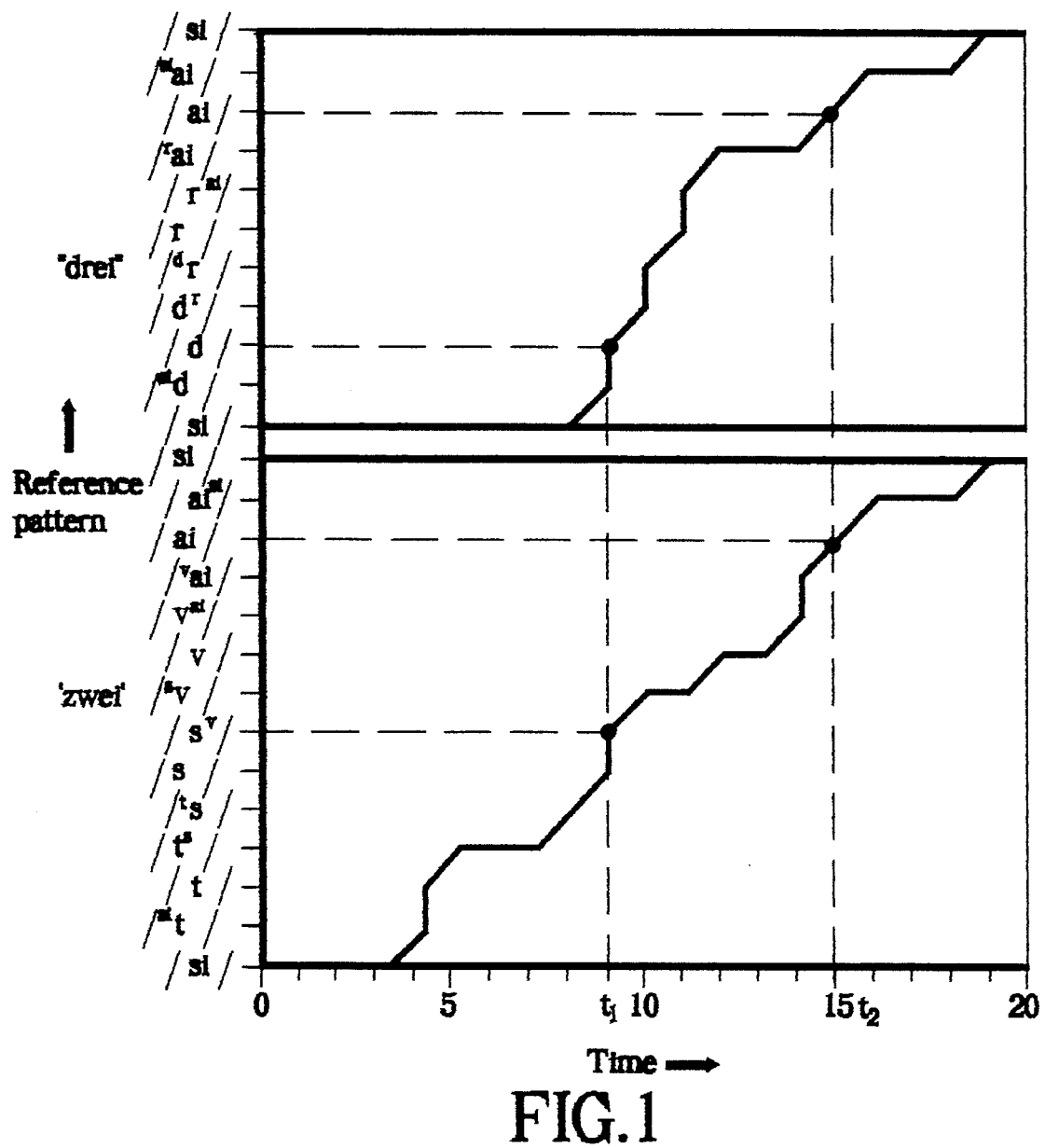
FIG. 1 shows state paths for models of the German words "drei" and "zwei".

The invention is described in more detail below with the aid of a preferred exemplary embodiment and of the figures.

Speech recognition is selected in this case as a special application area, in order to be able to explain the invention in more concrete and thus comprehensible form. However, in principle the invention can be applied beyond the field of speech recognition in the entire domain of pattern recognition in time-variant measurement signals.

The method is based on a main classification with the aid of a Viterbi decoding algorithm, which is followed by a discriminating reclassification by means of which the classification problem is reduced to the comparison of pairs of phonemes by weighting of feature vector components. In this case, different feature vector components are differently weighted in accordance with their capacity to discriminate phoneme pairs. It emerged in experiments that the speaker-independent recognition rate for the German language could be improved from 90 to 96%. In the case of the use a larger training data record and well trained word models, the recognition performance can be further increased.

The invention is based on the hidden Markov models, already presented, for phonemes and extends the recognition process by a reclassification in which the discrimination-relevant word parts or phonemes are examined separately in a second step after the main classification. The basic method is represented in a pseudo-code representation following the description. The total method consists of two parts, a main classification with the aid of the Viterbi decoding algorithm and a following reclassification by means of a comparison in pairs of hidden Markov models. In the course of the Viterbi decoding algorithm, total emission probabilities for hidden Markov models are calculated and the best assignment path from feature vectors to states of hidden Markov models is found with the aid of a backtracking method. In a variant of the method,, the hidden Markov models are subsequently sorted in accordance with their total emission probability. Suitably selected pairs, or all pairs of hidden Markov models are examined in the reclassification step by carrying out for each of these pairs a discriminating comparison of their assignments. The pairs of hidden Markov models are typically selected in accordance with values of their total emission probability. The discriminating comparison of the assignments of hidden Markov models to feature vectors is performed by calculating modified total emission probabilities for each hidden Markov model of a pair on the assumption that in each case the other hidden Markov model of the same pair competes with the hidden Markov model under review, and by determining the respectively more probable hidden Markov model of a pair. Of all pairs under review, the hidden Markov model with the highest total emission probability is selected. This selected hidden Markov model with the highest total emission probability corresponds to the recognized pattern, in the example of speech recognition to the word to be recognized.

The total emission probabilities for instance the generation of the sequence to be classified by means of a specific hidden Markov model are calculated by calculating for all feature vectors of the sequence to be classified and for all the states of the hidden Markov model a local logarithmized emission probability for the generation of the respective feature vector by the respective state, and by calculating an accumulated logarithmic emission probability for each state as sum of its local logarithmized emission probability and the accumulated logarithmic emission probability of its best possible predecessor state, the best possible predecessor state being logged.

The discriminating comparison of the assignments of two hidden Markov models is preferably carried out by calculating for all feature vectors of the temporal sequence a local logarithmic modified emission probability for the generation of the respective feature vector by the corresponding state of the respective hidden Markov model, and by adding these local logarithmic modified emission probabilities recursively along the already calculated assignment path to an accumulated logarithmic modified emission probability.

The modified logarithmic emission probability of generating a feature vector by a state of a hidden Markov model is calculated by calculating a logarithmic emission probability for each component of this feature vector and multiplying it by a weighting, and by adding these weighted logarithmic emission probabilities over all the components of this feature vector. In this process, the weighting of a component of a feature vector is a measure of the reliability of this component on the assumption that only two specific states of a hidden Markov model are to be compared with one another.

In a variant method, the weightings are determined with the aid of a statistical quality measure for the reliability of a feature vector component. In another variant method, the weightings are determined in a separate training method.

In the main classification step, use is made of methods known from the literature. In the reclassification step, the discrimination-relevant word parts are found and weighted in accordance with their discrimination capacity. In a simple transfer of the method of Moore to the hidden Markov models, the probabilities of the discrimination-relevant phonemes would be multiplied by a heuristically calculated weighting. In the present invention, by contrast, use is made of theoretically based weightings. These represent the recognition rates estimated with the aid of the distribution density functions on which the models are based: that is to say a weighting of 1 signifies a one hundred percent estimated recognition rate, while a weighting of 0 signifies a random recognition rate.

Moreover, it is not the emission probabilities of the feature vectors which are weighted, but the proportions of each individual feature vector component. This results in balancing the effect that the influence of individual components recedes too strongly into the background because of the growth in the number of components of newer recognition systems. If an /s/ is to be distinguished from a speech pause, it is immediately clear that the signal energy is a very important feature component, whereas it can contribute nothing to distinguishing between, for example, the sounds /o/ and /u/.

In order to estimate the recognition rate, use is made of the so-called Kolmogorov distance, which in the case of the distinction of only two competitors even represents the exact estimate. In the case of two classes, the error probability can be specified at once (K. Fukunaga, "Introduction to statistical pattern recognition", Academic Press, New York, 1972; J. Kittler, "Mathematical methods of feature selection in pattern recognition", Internat. J. Man-Machine Studies, 7:603–637, 1975):

$$E^* = 1/2[1 - \int dx\, p(x)\, |p(k_1|x) - p(k_2|x)|] \quad (1)$$

Here, x signifies the feature vector and p (k/x) the conditional probability for an occurrence of the class k given the presence of the feature vector x. $k_1$ and $k_2$ denote two classes or phonemes to be distinguished. The integral on the right-hand side of the equation can be interpreted as a measure of distance, in this case, it is the Kolmogorov distance:

$$J_k = \int dx\, p(x)\, |P(k_1|x) - p(k_2|x)| \quad (2)$$

By contrast with its actual definition for vectors, this distance is modified in such a way that the proportions of individual components are calculated separately:

$$j_k(x_i) = \int dx_i\, p(x_i)\, |p(k_1|x_i) - p(k_2|x_i)| \quad (3)$$

An essential task of the reclassification is to return the problem of speech recognition to the distinction of in each case two speech sounds. The use of the Viterbi decoding method in conjunction with a subsequent backtracking in the main classification ensures that a list of best word candidates is specified in the main classification, including an assignment of symbolic speech sounds to the temporal speech signal characteristic (segmentation).

In the first step of the reclassification, the first word candidate is compared with the second word candidate taking account of the discrimination-relevant phonemes and feature vector components. At each instant of the comparison, each hidden Markov model is in precisely one state of a phoneme. This is rendered clear with the aid of the example shown in FIG. 1. In the recognition of numeral words, the words "drei" and "zwei" are frequently confused. In almost all cases, the correct word is among the two best words, and the total generation probabilities are similar. The discrimination-relevant parts of these two words are relatively short with reference to their total length. It is assumed in FIG. 1 that the word "zwei" was actually spoken. FIG. 1 represents the time distortion paths or state paths, found in the recognition process by the Viterbi decoding, of the two best word candidates. The reference models consist here of context-dependent phoneme models.

Plotted on the abscissa is the unknown spoken word, while the phoneme models for the words to be compared are plotted on the ordinate. In order to increase the separability of these words, use is made of the following method for the reclassification: at every instant t a corresponding pair of phoneme models is considered which occur at this instant on the optimum state path. At the instant $t_1$, the model "s"" (end segment of /s/ with right context /v/) occurs in the word "zwei", whereas it is the model "d" (middle segment of /d/) which occurs at the same time in the word "drei". It is therefore necessary to perform an evaluation of the probability of these co-models under the boundary condition that these two classes alone can occur too. It is then possible to evaluate the components of the feature vector so as to achieve a maximum separability between these two classes. Similarly, at the instant $t_2$ the classes "ai" of the word model "zwei" are compared with "ai" of "drei". The separability disappears in this case, since the same phoneme models are used. The newly evaluated probabilities—which are now composed from the weighted probability proportions of the vector components—are multiplied up over the two paths. The decision is now taken in favor of that word model having the highest probability.

The better model is then compared with the next candidate from the word list. This method is continued until a suitable termination criterion is fulfilled. The latter can be either the termination after a specific number of candidates, or the undershooting of a minimum probability of generation of the word candidate.

Figure 2:
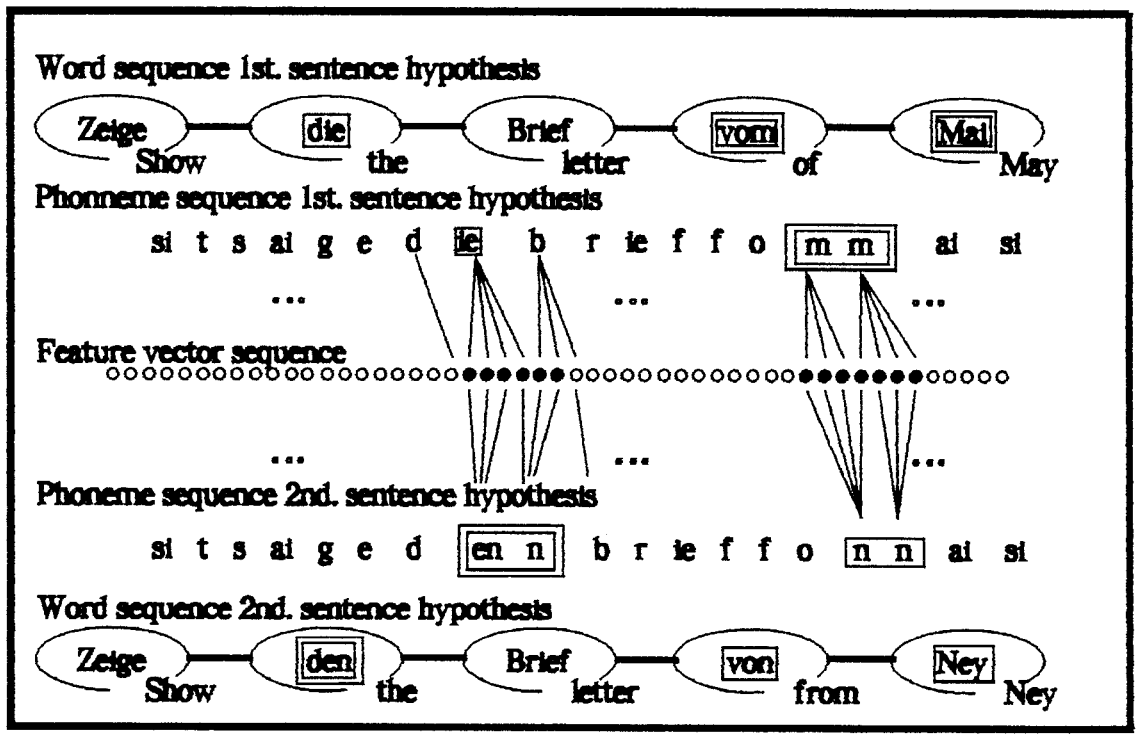
FIG. 2 shows a diagram for generating new set hypotheses in the case of connected speech.

The method can be further extended in the case of connected speech. By strict analogy with the recognition method for individual words, it is possible to select a best hypothesis only from set hypotheses already available, but not to generate a new hypothesis. New set hypotheses can also be generated from those available by means of the extension. For this purpose, a wordwise decision is taken as to which word from the two set hypotheses is better. Thus, the recognized utterance is a combination of the best words. FIG. 2 shows this with the aid of an example.

The essential improvements by comparison with known methods are thus:

- The return of speech recognition to the comparison of only in each case two speech sounds (phonemes).
- Weighting of the emission probabilities of the speech sounds using weightings which were adapted to a specific pair of speech sounds.
- Using distance measures (here, Kolmogorov distance) from probability theory as weighting factors.
- Generating new set hypotheses with the aid of reclassification in the case of connected speech.

It is assumed for the purpose of calculating the emission probabilities that these probabilities are weighted mixtures of Gaussian probability density functions with diagonal covariance matrix. On the assumption that the contribution of the best fitting mode is much larger for a given feature vector x than that of all the other modes of the mixture, the influence of the latter can be neglected. Since the Viterbi algorithm is used for training and for recognition, the logarithmic probability can be described as follows:

$$-\ln p(x) = \frac{N}{2} \ln(2\pi) - \ln c_k \quad (4)$$

$$+ \Sigma_{n=1,\ldots,N} \ln \sigma_{kn} + \frac{1}{2} \Sigma_{n=1,\ldots,N} \frac{(x_n - \mu_{kn})^2}{(\sigma_{kn})^2}$$

N signifying the number of the vector components and $c_k$ the weighting of the best mode k. If the variances are assumed to be constant, this expression is essentially the euclidian distance between the feature vector and the main vector of the best fitting mode.

In the reclassification proposed here, this distance is modified in order to improve the class discrimination. This is performed by applying specific weightings to each vector component in accordance with a capacity of the vector components to distinguish between two classes:

$$-\ln p_{mod}(x) = \text{const.} - \ln c_k \quad (5)$$
$$+ \Sigma_{n=1,\ldots,N} \ln \sigma_{kn} + \frac{1}{2} \Sigma_{n=1,\ldots,N} \frac{w_n(x_n - \mu_{kn})^2}{(\sigma_{kn})^2}$$

For the purpose of optimum discrimination, the weightings $w_n$ depend on the two classes to be separated. The first problem of classification therefore consists in reducing the problem of k classes to two classes. Of course, this is not possible in a single step, since the number of classes to be compared is much too large for such a mode of procedure in typical applications such as, for example, in speech recognition. For this reason, use is made of a reprocessing step which selects the best hypothesis from a list of hypotheses with the aid of a Viterbi decoder on the basis of hid,den Markov models. The Viterbi decoder must perform backtracking in this case, since the best paths of each hypothesis are required in the reprocessing step. The reduction to two classes is accomplished by comparing two hypotheses in pairs. In the example of speech recognition, each temporal subsequence consists of a pair of competing phonemes which have been determined by the preceding backtracking step. The emission probabilities of these two phonemes are calculated anew taking account of the distinguishing power of each feature component in this special case. The weighted emission probabilities are multiplied along the corresponding Viterbi paths, a modified total emission probability for the sentence hypothesis being calculated. After the better hypothesis has been selected, it is compared with the following candidates of the list of hypotheses. This procedure is continued until a prescribed number of hypotheses is reached.

The main advantage of integrating a distinguishing procedure into the recognition process consists in the capacity for a very accurate and subtle distinction between phonemes without a high outlay on computation. The extra outlay bound up with the proposed method is relatively low by comparison with the total recognition time, since only the probabilities along the Viterbi path need to be calculated anew.

A further task consists in determining the weightings $w_n$ for weighting the feature vector components. The weightings are calculated as statistical or information-theoretical separability measures for the use in the method proposed here. By contrast, heuristic weightings of the features are known from known approaches. One possibility consists in using a modified transinformation measure. The original definition for the transinformation is given by the expression $$J_T = \Sigma_{n=1,\ldots,N} \int p(k) p(x|k) \, ld\left(\frac{p(x|k)}{p(x)}\right) dx \quad (6)$$

This is a very general measure for the quality of distributions of multidimensional random variables arid has all the necessary properties of a distance measure. It is monotonic: between two extreme values: the measure vanishes for the case of no separation between the classes and assumes the value 1 in the case of a complete, error-free separation. For a use in the discriminating reprocessing step proposed here, the definition advanced above must be modified, since it has to be split in accordance with feature vector components. Since only pairs of classes are compared with one another in the reprocessing step, it is also necessary in the method present here for the transinformation to be calculated only taking account of pairs of classes. This produces a three-dimensional matrix whose elements are given as follows:

$$j_T(k_1,k_2,n) = \frac{1}{2} \Sigma_{k=k_1,k_2} \int p(x_n|k) \, ld\left(\frac{p(x_n|k)}{p(x_n)}\right) dx_n \quad (7)$$

$k_1$ and $k_2$ enumerating the classes to be compared, and $x_n$ representing a component of a feature vector. In the proposed reclassification step, the eigenvalues of this matrix for the weighting represented in formula 5 are selected for each comparison in pairs, specifically $w_n = j_T(k_1, k_2, n)$ for the comparison of classes $k_1$ and $k_2$.

Since these values still remain quite difficult to calculate, a different distance measure was used as a trial in experiments. The Kolmogorov distance (2) is a measure of the expected recognition mark for given classes and feature distributions. By analogy with the transformation measure, this must be split into a three-dimensional matrix $J_K$ having the elements:

$$j_K(k_1,k_2,n) = \int dx_n p(x_n) \, |p(k_1|x_n) - p(k_2|x_n)| \quad (8)$$

Application to Individual Word Recognition

The individual word recognition is based on context-dependent phoneme models. These phoneme models consist of three parts or segments which each consist of two states of which each has an emission probability. The first and the last part are context-dependent. Only the middle segment is not dependent on the context, since this segment is assumed to be stationary. The assumption is important as basis for a robust training using limited training data. The emission probabilities of the middle segments are linked via different words, thus rendering a good segmentation possible in training by means of the Viterbi method. Each word model consists of a sequence of suitable segment models in accordance with a transcription lexicon (K. Zünkler, "An ISDN speech server based on speaker independent continuous hidden markov models" in Proceedings of NATO-ASI, Springer-Verlag, July 1990).

The recognition process is now divided into two stages. In the first stage, use is made of a Viterbi decoding algorithm with backtracking. The result of this first step is an evaluated list of word candidates together with their Viterbi paths. In the second step, the best two candidates are enlisted and their corresponding paths are compared. This comparison can be represented with the aid of FIG. 1. FIG. 1 shows the Viterbi paths for the models of the words "drei" and "zwei" with the aim of determining the corresponding model states for each time interval, which are compared by the discriminating reclassification step. $t_1$ is a time interval having different model states by contrast with, for example, the time interval $t_2$, which makes no contribution to the weighted word probabilities.

There is exactly one model state in each word candidate for each time interval. In this way, only this pair of model states is compared for this specific time interval. A weighted probability is calculated for each candidate and summed up over the Viterbi path for all time intervals having different model states. After this comparison of the two candidates, the better of the two is compared with the next candidate of the list until a prescribed number of candidates have been compared. It is not necessary in this case to compare all candidates with one another. Experiments have shown that the recognition rate remains the same if instead of a rapid selection method in terms of pairs use is made of, for example, the K.O. method.

The technical terms used in this patent application are customary in the field of pattern recognition and in the field of speech recognition; their significance can be gathered from the following publications:

Thomas W. Parsons, "Voice and Speech Processing", McGraw Hill 1987 K. Fukunaga, "Introduction to statistical pattern recognition", Academic Press, New York 1972

L. R. Rabiner and B. H. Juang, "An introduction to hidden markov models", IEEE Transactions on Acoustics, Speech and Signal Processing, (1): 4–16, Jan. 1986

J. Kittler, "Mathematical methods of feature selection in pattern recognition", Internat. Journ. Man-Machine Studies, 7:603–637, 1975.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for recognizing patterns in time-variant measurement signals by classifying a temporal sequence of feature vectors and reclassification in pairs, comprising the steps of:

segmenting the sequence of feature vectors which is to be classified using a Viterbi decoding algorithm, this sequence to be classified being compared with a set of hidden Markov models;

calculating for each hidden Markov model a total emission probability for the generation of the sequence to be classified by this hidden Markov model;

determining an optimum assignment path from feature vectors to states of the hidden Markov models by backtracking;

calculating, for at least one pair of hidden Markov models, modified total emission probabilities for each hidden Markov model of said at least one pair on a precondition that a respective other hidden Markov model of a same pair competes with the hidden Markov model under review, the total emission probability being calculated, for generating the sequence to be classified by a hidden Markov model, by calculating for all feature vectors of the sequence to be classified and for all states of the hidden Markov model a local logarithmic emission probability for generating the respective feature vector by the respective state, and by calculating an accumulated logarithmic emission probability for each state as a sum of its local logarithmic emission probability and an accumulated logarithmic emission probability of its best possible predecessor state, the best possible predecessor state being logged;

determining a respective more probable hidden Markov model of said at least one pair;

selecting the hidden Markov model having the highest total emission probability from among all pairs under review.

2. The method as claimed in claim 1, wherein the method further comprises carrying out a discriminating comparison of the assignments of two hidden Markov models by calculating for all feature vectors of the temporal sequence a local logarithmic modified emission probability for generating the respective feature vector by the corresponding state of the respective hidden Markov model by adding these local logarithmic modified emission probabilities recursively along the already calculated assignment path to an accumulated logarithmic modified emission probability.

3. The method as claimed in claim 2, wherein the method further comprises calculating the modified local emission probability, for generating a feature vector by a state of a hidden Markov model, by calculating a logarithmic emission probability for each component of this feature vector and multiplying the logarithmic emission probability by a weighting, and by summing these weighted logarithmic emission probabilities over all components of this feature vector; the weighting of a component of a feature vector being in this case a measure of the reliability of this component on an assumption that only two specific states of a hidden Markov model are to be compared with one another.

4. The method as claimed in claim 3, wherein the weightings are determined using a statistic quality measure for the reliability of a feature vector component.

5. The method as claimed in claim 3, wherein the weightings are determined using a training method.

6. A method for recognizing patterns in time-variant measurement signals by classifying a temporal sequence of feature vectors and reclassification in pairs, comprising the steps of:

segmenting the sequence of feature vectors which is to be classified using a Viterbi decoding algorithm, this sequence to be classified being compared with a set of hidden Markov models;

calculating, for pairs of hidden Markov models, modified total emission probabilities for each hidden Markov model of a respective pair of the hidden Markov models on a precondition that a respective other hidden Markov model of a same pair competes with the hidden Markov model under review, the total emission probability being calculated, for generating the sequence to be classified by a hidden Markov model, by calculating for all feature vectors of the sequence to be classified and for all states of the hidden Markov model a local logarithmic emission probability for generating the respective feature vector by the respective state, and by calculating an accumulated logarithmic emission probability for each state as a sum of its local logarithmic emission probability and an accumulated logarithmic emission probability of its best possible predecessor state, the best possible predecessor state being logged;

determining a respective more probable hidden Markov model of said respective pair;

selecting the hidden Markov model having the highest total emission probability from among all pairs under review; and determining an optimum assignment path from feature vectors to states of the hidden Markov models by backtracking.

7. The method as claimed in claim 6, wherein the method further comprises carrying out the discriminating comparison of the assignments of two hidden Markov models by calculating for all feature vectors of the temporal sequence a local logarithmic modified emission probability for generating the respective feature vector by the corresponding state of the respective hidden Markov model by adding these local logarithmic modified emission probabilities recursively along the already calculated assignment path to an accumulated logarithmic modified emission probability.

8. The method as claimed in claim 7, wherein the method further comprises calculating the modified local emission probability, for generating a feature vector by a state of a hidden Markov model, by calculating a logarithmic emission probability for each component of this feature vector and multiplying the logarithmic emission probability by a weighting, and by summing these weighted logarithmic emission probabilities over all components of this feature vector; the weighting of a component of a feature vector being in this case a measure of the reliability of this component on an assumption that only two specific states of a hidden Markov model are to be compared with one another.

9. The method as claimed in claim 8, wherein the weightings are determined using a statistic quality measure for the reliability of a feature vector component.

10. The method as claimed in claim 8, wherein the weightings are determined using a training method.

11. A method for recognizing patterns in time-variant measurement signals by classifying a temporal sequence of feature vectors and reclassification in pairs, comprising the steps of:

- segmenting the sequence of feature vectors which is to be classified using a Viterbi decoding algorithm, this sequence to be classified being compared with a set of hidden Markov models;
- calculating for each hidden Markov model a total emission probability for the generation of the sequence to be classified by this hidden Markov model;
- determining an optimum assignment path from feature vectors to states of the hidden Markov models by backtracking;
- calculating, for at least one pair of hidden Markov models, modified total emission probabilities for each hidden Markov model of said at least one pair on a precondition that a respective other hidden Markov model of a same pair competes with the hidden Markov model under review, a local logarithmic modified emission probability being calculated for all feature vectors of the temporal sequence for generating a respective feature vector by the corresponding state of the respective hidden Markov model by adding local logarithmic modified emission probabilities recursively along the already calculated assignment path to an accumulated logarithmic modified emission probability, a total emission probability being calculated, for generating the sequence to be classified by a hidden Markov model, by calculating for all feature vectors of the sequence to be classified and for all states of the hidden Markov model a local logarithmic emission probability for generating the respective feature vector by the respective state, and by calculating an accumulated logarithmic emission probability for each state as a sum of its local logarithmic emission probability and an accumulated logarithmic emission probability of its best possible predecessor state, the best possible predecessor state being logged;
- determining a respective more probable hidden Markov model of said at least one pair; and
- selecting the hidden Markov model having the highest total emission probability from among all pairs under review.

12. The method as claimed in claim 11, wherein the method further comprises calculating the modified local emission probability, for generating a feature vector by a state of a hidden Markov model, by calculating a logarithmic emission probability for each component of this feature vector and multiplying the logarithmic emission probability by a weighting, and by summing these weighted logarithmic emission probabilities over all components of this feature vector; the weighting of a component of a feature vector being in this case a measure of the reliability of this component on an assumption that only two specific states of a hidden Markov model are to be compared with one another.

13. The method as claimed in claim 12, wherein the weightings are determined using a statistic quality measure for the reliability of a feature vector component.

14. The method as claimed in claim 12, wherein the weightings are determined using a training method.

* * * * *